(12) United States Patent
Lane et al.

(10) Patent No.: US 6,978,121 B1
(45) Date of Patent: Dec. 20, 2005

(54) METHOD AND APPARATUS FOR OPERATING A DUAL-MODE RADIO IN A WIRELESS COMMUNICATION SYSTEM

(75) Inventors: Mark Lane, San Diego, CA (US); Terrance Raymond Bourk, La Jolla, CA (US); Glenn Murphy, San Diego, CA (US); David Akira Yamasaki, San Diego, CA (US)

(73) Assignee: RFMD WPAN, INC, San Diego, CA (US)

( * ) Notice: Subject to any disclaimer, the term of this patent is extended or adjusted under 35 U.S.C. 154(b) by 582 days.

(21) Appl. No.: 10/288,209

(22) Filed: Nov. 5, 2002

(51) Int. Cl.$^7$ ................................................ H04B 1/38
(52) U.S. Cl. .................... 455/73; 455/103; 455/552.1
(58) Field of Search .................... 455/73, 78, 552.1, 455/553.1, 101–103, 132, 272, 277.1, 277.2; 375/267, 347

(56) References Cited

U.S. PATENT DOCUMENTS

| | | | |
|---|---|---|---|
| 6,128,476 A * | 10/2000 | Fujita | 455/101 |
| 6,560,443 B1 * | 5/2003 | Vaisanen et al. | 455/73 |
| 2004/0029619 A1 * | 2/2004 | Liang et al. | 455/562.1 |

OTHER PUBLICATIONS

"Specification of the Bluetooth System", Specification vol. 1, Version 1.1, Part B, Section 1, pp. 41-42, Section 2.1, p. 43, Section 4.1-2, pp. 47-50, Section 10-9, p. 120 and Section 11, pp. 126-137, published Feb. 22, 2001.

Alpha Industries, Inc., PHEMT GaAs IC SPDT Switch DC-3 GHz, AS179-92, published Aug., 2000.

* cited by examiner

Primary Examiner—Lee Nguyen (74) Attorney, Agent, or Firm—Withrow & Terranova, PLLC (57) ABSTRACT

The present invention is a method and apparatus for operating a dual-mode radio (DMR) in a wireless communication system. The present invention provides "coexistence" or cooperation of Bluetooth™ and 802.11 devices operating in close proximity to each other within a DMR. The present inventive method and apparatus reduces reception errors and prevents saturation of the Bluetooth™ devices caused by 802.11 transmissions. The present inventive antenna switching method provides a means for coupling multiple antennas to Bluetooth™ and 802.11 transmit and receive devices. Saturation of the Bluetooth™ receive devices is prevented by electrically isolating the Bluetooth™ receive devices from antennas used by the 802.11 device during 802.11 transmissions. The antenna switching apparatus includes a plurality of switches capable of selectively coupling and decoupling first and second antennas to an 802.11 and a Bluetooth™ device.

24 Claims, 8 Drawing Sheets

METHOD AND APPARATUS FOR OPERATING A DUAL-MODE RADIO IN A WIRELESS COMMUNICATION SYSTEM

CROSS-REFERENCE TO RELATED APPLICATION

This invention is related to commonly assigned co-pending application Ser. No. 10/216,082, filed Aug. 8, 2002, entitled "Method and Apparatus for a Dual-Mode Radio in a Wireless Communication System", incorporated by reference herein in its entirety and referred to hereafter as "the related application".

BACKGROUND OF THE INVENTION

1. Field of the Invention

This invention relates to Bluetooth™ and 802.11 wireless communication systems, and more particularly to a method and apparatus for operating a dual-mode radio in a wireless communication system.

2. Description of Related Art

Wireless communication systems facilitate high-speed connectivity and data and voice transport from point-to-point and point-to-multipoint bases. Exemplary wireless communication systems include "Bluetooth™ protocol" systems that facilitate the transport of data between Bluetooth™ devices such as wireless headsets, cellular phones, laptop computers and personal digital assistants (PDAs), and "IEEE 802™ protocol" systems that facilitate the transport of data over wireless local area networks (WLANs), which include devices such as desktop and laptop computers.

As is well known, Bluetooth™ is a global specification standard for radio communications operating at 2.4 GHz radio frequencies. Bluetooth™ devices (i.e., those that comply with the Bluetooth™ Specification) replace normal cable connections using short-range radio links.

Bluetooth™ protocol technology is featured in cordless telephony, intercom, FAX and LAN access, and dial-up networking applications. Bluetooth™ wireless communication protocols are implemented in wireless headsets, cellular phones, PDAs, printers, and other mobile devices. Bluetooth™ technology is described in more detail in a specification produced by the Bluetooth™ Special Interest Group (SIG), entitled "Specification of the Bluetooth™ version 1.1", electronically available to the public via the well-known Internet at <http://www.Bluetooth.com>, published on Feb. 22, 2001, referred to herein as the "Bluetooth™ Specification", and incorporated for reference herein in its entirety for its teachings on Bluetooth™ flow control, signals, devices and communication protocols and schemes.

In addition to the Bluetooth™ communications protocol, various IEEE 802.11 communication protocols (referred to hereinafter as "802.11") exist for radio communications operating at 2.4 GHz radio frequencies. One exemplary well-known IEEE 802.11 communications protocol is the IEEE 802.11b protocol (referred to hereinafter as "802.11b"). The 802.11b protocol allows 802.11b devices (i.e., those that comply with the 802.11b standard) to operate at high data transmission rates (e.g., 11 Mbps). The 802.11b protocol is particularly useful in implementing Wireless Local Area Networks (WLANs). 802.11b devices are described in more detail in a standard produced by the IEEE 802 Working Group, entitled "IEEE Std 802.11b-1999", electronically available to the public via the well-known Internet at <http://standards.ieee.org>, referred to herein as the "802.11b Specification", and incorporated for reference herein in its entirety for its teachings on 802.11b flow control, signals, devices and communication protocols and schemes.

Another exemplary IEEE 802.11 communications protocol is the newly emerging IEEE 802.11 g. Some embodiments of the invention are described below using the IEEE 802.11b protocol as an exemplary communications protocol. However, this is not meant as a limitation to the present invention as the present inventive method and apparatus contemplates use of any of the IEEE 802.11 communication protocols and future variants. Therefore, the generic "IEEE 802.11" term used below encompasses all IEEE 802.11 communication protocols.

Most 802.11b devices use at least two antennas to provide an "antenna diversity" function in the receiver. As is well known, antenna diversity is used to compensate for the detrimental effects of signal path loss (e.g., multipath fading, reflections, and absorption). Antenna diversity requires use of at least two antennas. In accordance with well-known antenna diversity techniques, receivers measure the signal quality of multiple antennas and select (for the transmission and reception of data) the antenna having the best signal quality. In contrast to 802.11 devices, Bluetooth™ devices typically use only one antenna because the communication schemes used by the Bluetooth m devices are less prone to signal path loss.

Because both Bluetooth™ and 802.11 devices are widely used and readily available, it is desirable to operate both Bluetooth™ and 802.11 devices within close proximity to one another. This is especially true when the devices are used in implementing a single common communications device. For example, a laptop can include both a Bluetooth™ protocol device for wireless communication with a Bluetooth™ wireless mouse, and an 802.11 protocol device for wireless communication with an 802.11 WLAN access point.

Disadvantageously, heretofore when Bluetooth™ and 802.11 protocol devices operate in close proximity, interference can be produced adversely affecting communication using both protocols. Interference occurs because both protocols operate on the 2.4 GHz ISM frequency band. Specifically, over-air interference and saturation of one transmitter by another transmitter can occur when a Bluetooth™ antenna is in close proximity (e.g., within one-half meter) of an 802.11 antenna. As is well known, interference increases the probability of reception errors. In any data communication system, it is desirable to reduce the probability reception errors.

Saturation of Bluetooth™ devices can occur because the Bluetooth™ protocol requires RF transmit powers of 1 mW, whereas, the 802.11 protocol requires RF transmit powers of 30 to 100 mW. Thus, when an 802.11 transceiver operates within close proximity to a Bluetooth™ device, the 802.11 transmit signals can increase the receiver signal levels so that Bluetooth™ front-end circuits are driven into non-linear ranges. This can decrease Bluetooth™ reception quality. In certain situations, the 802.11 transmit signals are sufficiently strong to cause physical damage to the Bluetooth™ devices.

A need therefore exists for a dual-mode radio method and apparatus that uses devices operating in conformance with the Bluetooth™ and 802.11 communication protocols. The method and apparatus should prevent saturation of the Bluetooth™ protocol devices. The present invention provides such a dual-mode radio method and apparatus.

SUMMARY OF THE INVENTION

The present invention is a method and apparatus for operating a dual-mode radio (DMR) that provides "coexistence" or cooperation between Bluetooth™ and 802.11 protocol devices. The method and apparatus reduces reception errors and prevents saturation of Bluetooth™ protocol devices.

The method provides a means for selectively coupling multiple antennas to Bluetooth™ and 802.11 devices. Providing electrical separation and isolation between the Bluetooth™ receivers and the DMR antennas reduces saturation of the Bluetooth™ receivers.

The inventive DMR apparatus includes a plurality of switches capable of selectively coupling and decoupling a first antenna and a second antenna to an 802.11 device and a Bluetooth™ device. The inventive DMR apparatus includes a means for providing electrical separation (or decoupling) between Bluetooth™ receivers and the first and second antennas during 802.11 transmissions.

The present invention can be utilized in any wireless communication system that uses a dual mode radio. Reception errors in DMR devices are reduced while adequately maintaining data transmission rates for both the Bluetooth™ and 802.11 devices. In addition, the present method and apparatus reduces saturation of Bluetooth™ receivers caused by transmissions from 802.11 transceivers.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations to the present invention.

The present invention is a method and apparatus for use in a dual-mode radio (DMR) in a wireless communication system. The present invention facilitates the coexistence and cooperation of Bluetooth™ and 802.11 devices operating in close proximity within a DMR.

Figure 1:
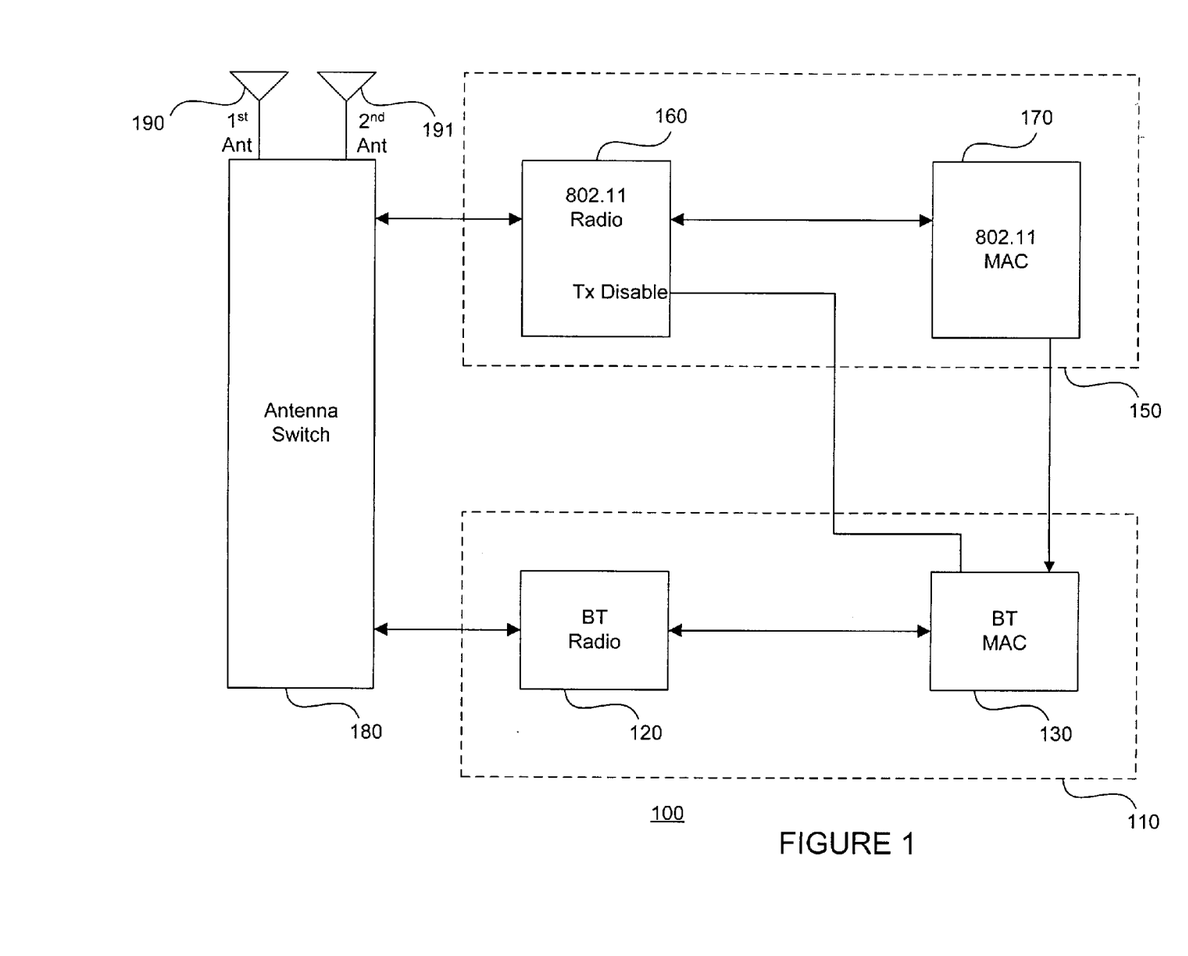
FIG. 1 is a block diagram showing a first exemplary dual-mode radio adapted for use with the present invention.

Exemplary Dual-Mode Radio (DMR) and Switching Apparatus Adapted for use with the Present Invention The exemplary dual-mode radio (DMR) provides Bluetooth™ and 802.11 functionality using a single pair of antennas. A first exemplary DMR is now described with reference to FIG. 1. Components of the exemplary DMR of FIG. 1 are described in greater detail in the incorporated Bluetooth™ and 802.11b specifications. Those skilled in the communication art shall recognize that the DMR of FIG. 1 is exemplary only, and therefore, is not meant to be a limitation to the present invention.

As shown in FIG. 1, the first exemplary DMR apparatus 100 includes a Bluetooth™ (BT) device 110, an 802.11 device 150, an antenna switch 180, a first antenna 190 and a second antenna 191. The BT device 110 and the 802.11 device 150 share use of the first antenna 190 and the second antenna 191 for transmissions of data to and from other BT and 802.11 devices.

As shown in FIG. 1, the first antenna 190 and the second antenna 191 are connected to the BT and 802.11 devices via the present inventive antenna switching apparatus 180. The inventive antenna switch 180 is coupled to and in communication with the BT device 110 and the 802.11 device 150. The antenna switch 180 selectively couples and decouples (i.e., switches) the antennas 190, 191 to the BT device 110 and the 802.11 device 150. The antennas 190, 191 can be used separately for data transmission and/or reception via the antenna switch 180. For example, in a first time period, the first antenna 190 can be used for 802.11 data transmissions and the second antenna 191 can contemporaneously be used for the reception of data. In a second time period, the first antenna 190 can be used for 802.11 data reception and the second antenna 191 can be contemporaneously used for Bluetooth™ data transmissions. In a third time period, the first antenna 190 can be used for 802.11 data reception and the second antenna 191 can be used for BT data reception. Details of the switching operation of the antennas 190, 191 are described in more detail below.

As shown in FIG. 1, the BT device 110 includes a BT radio 120 and a BT medium access control (MAC) 130. The 802.11 device 150 similarly includes an 802.11 radio 160 and an 802.11 MAC 170. The MACs ensure that the physical medium (e.g., the 2.4 Ghz frequency band) is shared in a fair, consistent and efficient manner. The MAC controls client access to the physical communication medium. If contentions are permitted, the MAC controls the contention process and resolves any collisions that may occur. The MAC is part of a layered data transport protocol wherein the lowest data transport layer is the physical signaling layer. The physical transport layer is used to interface the higher communication protocol layers with the shared physical medium.

The BT device 110 provides a means for the higher communication protocol Bluetooth™ communication layers to transmit and receive data through either the first antenna 190 or the second antenna 191. As shown in FIG. 1, the BT MAC 130 is operatively coupled to the BT radio 120, the 802.11 MAC 170 and the 802.11 radio 160. When operating in a BT transmission mode, the BT MAC 130 receives data from higher communication layers and transmits data to the BT radio 120 for transmission via either the first antenna 190 or the second antenna 191. When operating in a BT reception mode, the BT MAC 130 receives data from the BT radio 120 and transmits data to higher communication layers. The BT MAC 130 receives information from the 802.11 MAC 170 regarding the priority of 802.11 events. As described in more detail in the above-incorporated related application, the BT MAC 130 is capable of transmitting a transmit disable command to the 802.11 radio 160 via a Tx Disable input line of the 802.11 radio 160.

Similarly, the 802.11 device 150 provides a means for the higher communication protocol 802.11 communication layers to transmit and receive data through either the first antenna 190 or the second antenna 191. The 802.11 MAC 170 is operatively coupled to the 802.11 radio 160 and the BT MAC 130. When operating in an 802.11 transmission mode, the 802.11 MAC 170 receives data from the higher communication layers and transmits data to the 802.11 radio 160 for transmission via either the first antenna 190 or the second antenna 191. When operating in an 802.11 reception mode, the 802.11 MAC 170 receives data from the 802.11 radio 160 and transmits data to the higher communication layers. The 802.11 MAC 170 transmits information to the BT MAC 130 regarding the priority of 802.11 events.

As described in more detail in the above-incorporated related application, in one embodiment of the DMR switching apparatus, the BT MAC 130 transmits a transmit disable command to the 802.11 radio 160 whenever the BT MAC 130 needs to process a high-priority BT receive or transmit event. In this manner, the BT device 110 secures an antenna for purposes of sending or receiving high priority messages. A second exemplary DMR is now described with reference to FIG. 2.

Figure 2:
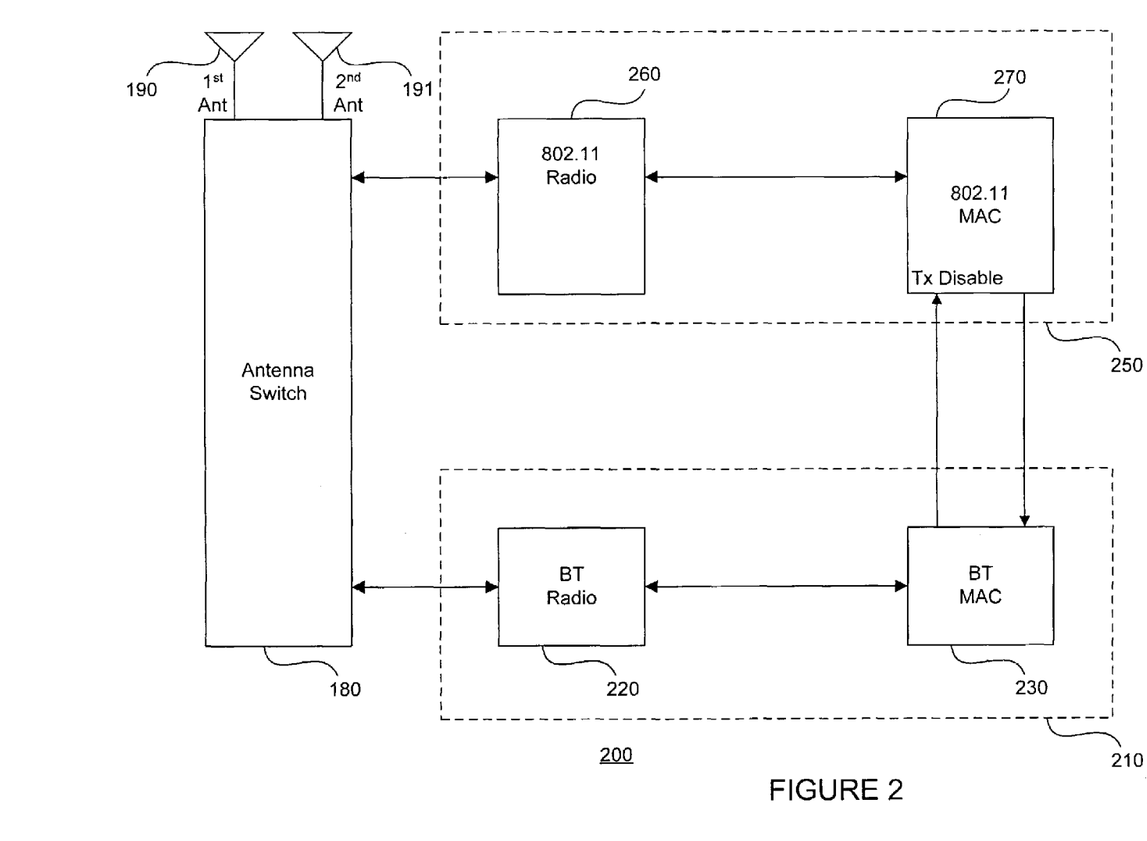
FIG. 2 is a simplified block diagram showing a second exemplary dual-mode radio adapted for use with the present invention.

FIG. 2 is a simplified block diagram showing a second exemplary DMR adapted for use with the present invention. As shown in FIG. 2, the second exemplary DMR 200 includes a BT device 210, an 802.11 device 250, the present inventive antenna switching apparatus 180, a first antenna 190 and a second antenna 191. The second exemplary DMR 200 is similar to the first exemplary DMR 100, and thus, identical components are not described further herein.

As shown in FIG. 2, the BT device 210 includes a BT radio 220 and a BT MAC 230. The 802.11 device 250 includes an 802.11 radio 260 and an 802.11 MAC 270. The BT MAC 230 is operatively coupled to the BT radio 220 and the 802.11 MAC 270. The BT MAC 230 selectively transmits a transmit disable command to the 802.11 MAC 270.

The 802.11 device 250 provides a means for the higher 802.11 communication protocol layers to transmit and receive data through the antennas 190, 191. The 802.11 MAC 270 is operatively coupled to the 802.11 radio 260 and the BT MAC 230. The 802.11 MAC 270 transmits information to the BT MAC 230 regarding the priority of 802.11 events. As described in the corresponding related application, the 802.11 MAC 270 receives a transmit disable command from the BT MAC 230. When the transmit disable signal is received by the MAC 270, the 802.11 MAC 270 disables 802.11 transmissions.

A first embodiment of the present inventive switching apparatus 180 of FIGS. 1 and 2 is now described in greater detail with reference to FIG. 3. The antenna switching apparatus 180 of FIGS. 1 and 2 facilitates the selective coupling and decoupling of the 802.11 and Bluetooth™ devices to the antennas 190, 191.

Figure 3:
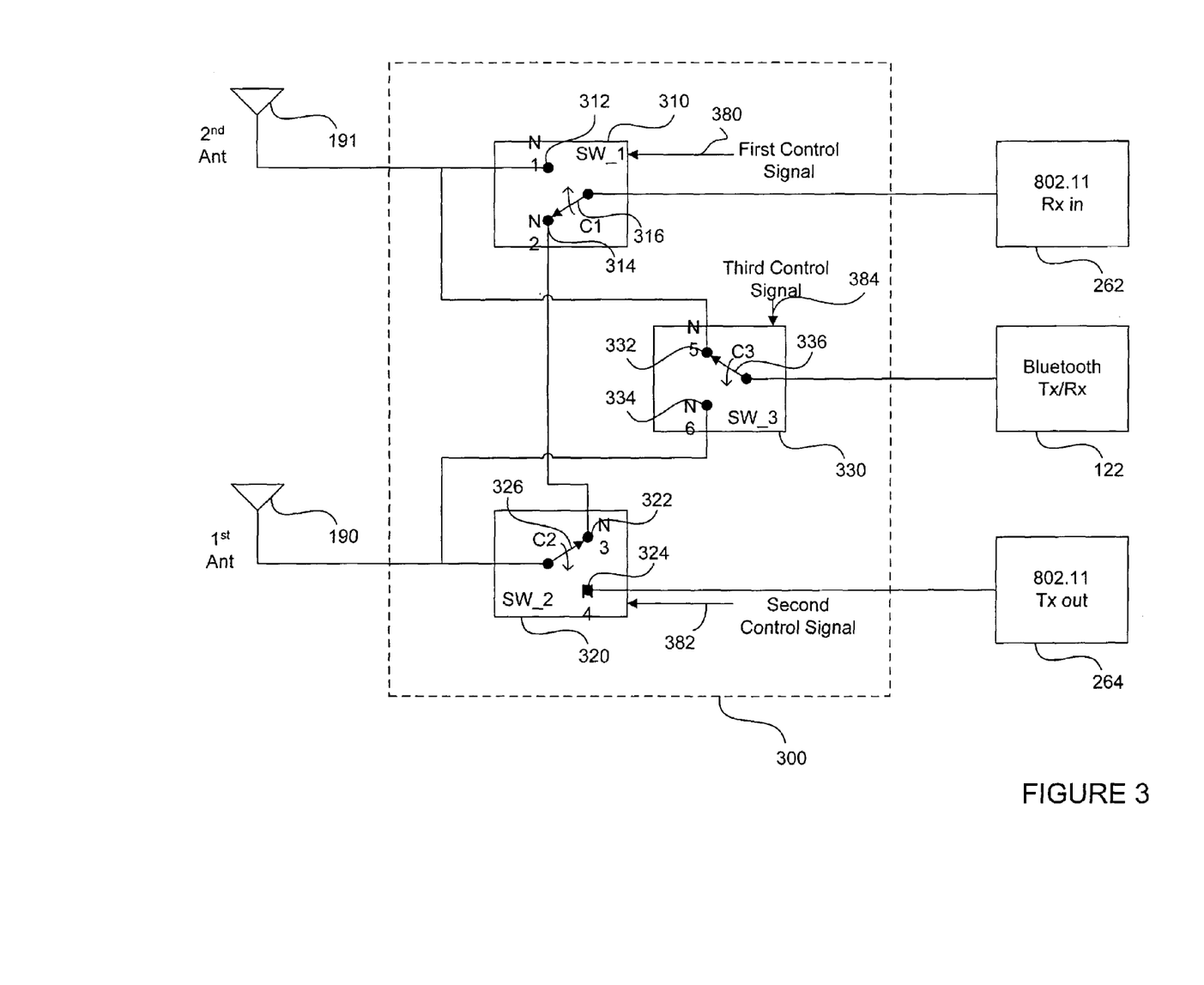
FIG. 3 is a simplified block diagram showing a first exemplary antenna switching apparatus adapted for use with the present invention.

FIG. 3 is a simplified block diagram showing a first exemplary antenna switching apparatus in accordance with the present invention. The first exemplary antenna switching apparatus 300 of FIG. 3 implements the antenna switch 180 of FIGS. 1 and 2. As shown in FIG. 3, the first exemplary switching apparatus 300 is operatively connected to the antennas 190, 191. The first exemplary switching apparatus 300 is also coupled to an 802.11 Rx in ("Receive In") device 262, an 802.11 Tx out ("Transmit Out") device 264, and a Bluetooth™ Tx/Rx ("Transmit/Receive") device 122. The 802.11 Rx in device 262 and the 802.11 Tx out device 264 are components of the 802.11 radio 160, 260 described above with reference to FIGS. 1 and 2. The Bluetooth™ Tx/Rx device 122 is a component of the BT radio 120, 220 described above with reference to FIGS. 1 and 2. The switching apparatus 300 selectively connects and disconnects (i.e., switches) the first antenna 190 and the second antenna 191 to the 802.11 Rx in device 262, the 802.11 Tx out device 264, and the Bluetooth™ Tx/Rx device 122. In one embodiment, the 802.11 Tx out device 264 is switched to the first antenna 190 only.

As shown in FIG. 3, the switching apparatus 300 includes a first switch (sw_1) 310, a second switch (sw_2) 320, and a third switch (sw_3) 330. The first switch 310 is coupled to the second antenna 191, the 802.11 Rx in device 262, the second switch 320, and the third switch 330. The first switch 310 includes a first node (N1) 312, a second node (N2) 314, and a first switch contact element (C1) 316. The first node N1 312 is coupled to the second antenna 191 as shown in FIG. 3. The first switch contact element C1 316 is connected to the 802.11 Rx in device 262. The first contact element C1 316 can be selectively switched to couple to either the first node N1 312 or to the second node N2 314. The first switch 310 receives a first control signal 380 that determines whether the first contact element C1 316 is switchably connected to the first node N1 312 or the second node N2 314 of the switch 310.

Similarly, the second switch 320 is coupled to the first antenna 190, the 802.11 Tx out device 264, the first switch 310, and the third switch 330. The second switch 320 includes a third node (N3) 322, a fourth node (N4) 324, and a second contact element (C2) 326. The third node N3 322 is coupled to the second node N2 314 of the first switch 310. The fourth node N4 324 is coupled to the 802.11 Tx out device 264. The second contact element C2 326 is operatively coupled to the first antenna 190. The second contact element C2 326 can be selectively switched to couple to either the third node N3 322 or the fourth node N4 324. The second switch 320 receives a second control signal 382 that determines whether the second contact element C2 326 is switchably connected to the third node N3 322 or the fourth node N4 324.

The third switch 330 is coupled to the first antenna 190, the second antenna 191, and the Bluetooth™ Tx/Rx device 122. The third switch 330 includes a fifth node (N5) 332, a sixth node (N6) 334, and a third contact element (C3) 336. The fifth node N5 332 is connected to the first node N1 312 of the first switch 310, and also to the second antenna 191. The sixth node N6 334 is coupled to the second contact element C2 326 of the second switch 320, and also to the first antenna 190. The third contact element C3 336 is coupled to the Bluetooth™ Tx/Rx device 122. The third contact element C3 336 can be selectively switched to couple to either the fifth node N5 332 or the sixth node N6 334. The third switch 330 receives a third control signal 384 that determines whether the third contact element C3 336 is switched to the fifth node N5 332 or the sixth node N6 334.

As described in more detail below, the switching apparatus 300 selectively couples and decouples the 802.11 Tx out device 264 to the first antenna 190. The inventive antenna switching apparatus 300 also selectively couples and decouples the 802.11 Rx in device 262 and the Bluetooth™ Tx/Rx device 122 to the antennas 190, 191.

More specifically, and as shown in FIG. 3, the antennas 190, 191 are selectively coupled to the transmit and receive devices in the following manner. To provide coupling between the 802.11 Tx out device 264 and the first antenna 190, the second contact element C2 326 is selectively coupled to the fourth node N4 324. To provide coupling between the 802.11 Rx in device 262 and the second antenna 191, the first contact element C1 316 is selectively coupled to the first node N1 312. To provide coupling between the 802.11 Rx in device 262 and the first antenna 190, the first contact element C1 316 is selectively coupled to the second node N2 314 and the second contact element C2 326 is selectively coupled to the third node N3 322. To provide coupling between the Bluetooth™ Tx/Rx device 122 and the first antenna 190, the third contact element C3 336 is selectively coupled to the sixth node N6 334. To provide coupling between the Bluetooth™ Tx/Rx device 122 and the second antenna 191, the third contact element C3 336 is selectively coupled to the fifth node N5 332.

The above-described switching apparatus operation and the resulting selective coupling between the antennas 190, 191 and the transmit/receive devices are implemented using control signals that control the various switch contact elements. The control signal operation used to control the various switches of the first exemplary switching apparatus 300 is now described.

The control signals ensure the proper switch operation of a DMR (e.g., the first exemplary DMR 100 and the second exemplary DMR 200 described above with reference to FIGS. 1 and 2). Proper switch operation of a DMR prevents the DMR components (e.g., the 802.11 Rx in device 262 and the Bluetooth™ Tx/Rx device 122) from being improperly coupled to the antennas. An example of an improper coupling of DMR components occurs when the 802.11 Tx out device 264 and the Bluetooth™ Tx/Rx device 122 are simultaneously coupled to the same antenna. As described above, such an improper switch coupling could result in the saturation of or even physical damage to the Bluetooth™ device.

As shown in FIG. 3 and as described above, the first switch 310, the second switch 320 and the third switch 330 respectively receive the first control signal 380, the second control signal 382, and the third control signal 384. A first exemplary control scheme adapted for use with the first exemplary switching apparatus 300 is now described.

Figure 4A:
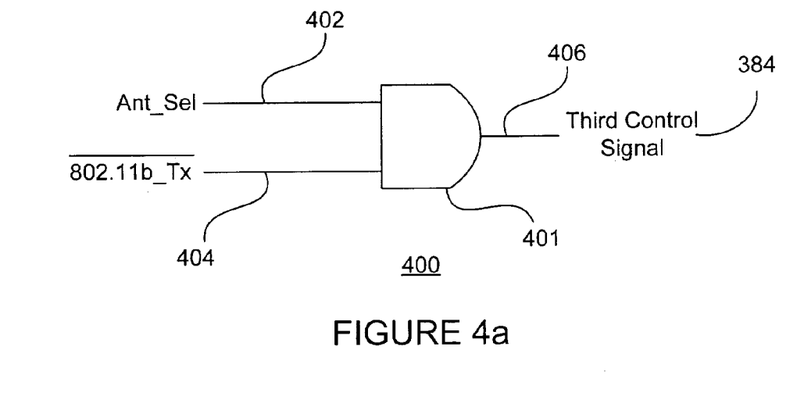
FIG. 4a shows a first exemplary embodiment of a control signal generating means.
Figure 4B:
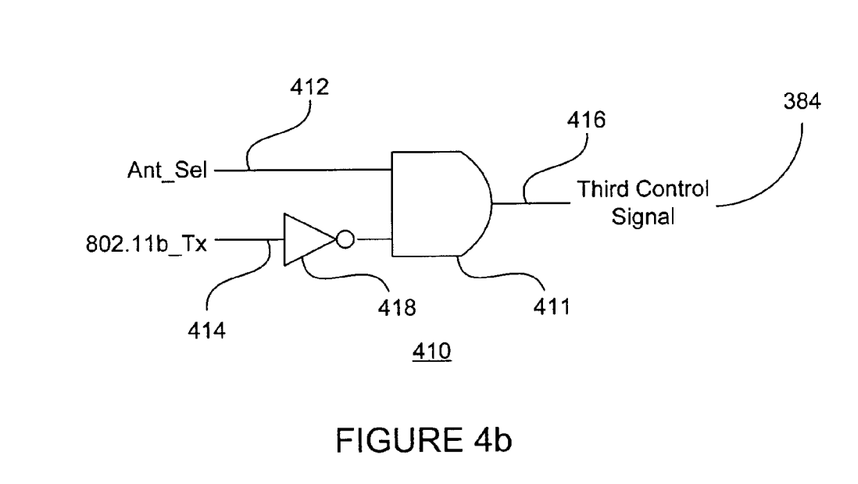
FIG. 4b shows a second exemplary embodiment of a control signal generating means.

In a first exemplary control scheme, the control signals correspond to an antenna select ("Ant_sel") control signal, an 802.11 transmitting ("802.11_Tx") control signal or a logical combination of one or both of the "Ant_sel" and "802.11_Tx" control signals. In one embodiment of the first exemplary control scheme, the first control signal corresponds to the Ant_sel control signal. The second control signal corresponds to the 802.11_Tx control signal. The third control signal corresponds to the output of a well known logical ANDing of the Ant_sel control signal and the inverse of the 802.11_Tx control signal. FIGS. 4a and 4b show two exemplary circuits used to generate the third control signal.

FIG. 4a shows a first exemplary embodiment of a third control signal generating means. As shown in FIG. 4a, the first exemplary embodiment 400 includes a logical AND gate 401, a first input 402, a second input 404 and an output 406. In the first exemplary embodiment 400, the first input 402 receives the Ant_sel control signal and the second input 404 receives the inverse of the 802.11_Tx control signal. The logical AND gate 401 inputs the aforementioned signals and produces the third control signal 384 at the output 406.

FIG. 4b shows a second exemplary embodiment of a third control signal generating means. As shown in FIG. 4b, the second exemplary embodiment 410 includes a logical AND gate 411, a first input 412, a second input 414, an output 416 and an inverter 418. In the second exemplary embodiment 410, the first input 412 receives the Ant_sel control signal. The second input 414 receives the 802.11_Tx control signal. The inverter 418 receives the 802.11_Tx control signal and produces an inverse of the 802.11_Tx control signal. The logical AND gate 411 receives the Ant_sel control signal and the inverse of the 802.11_Tx control signal. The logical AND gate 411 produces the third control signal 384 at its output 416.

The following table (TABLE 1) provides definitions for the first exemplary antenna switch control scheme:

TABLE 1

|  | Ant_sel | 802.11_Tx | Antenna | Contact/Node |
|---|---|---|---|---|
| Bluetooth ™ Tx/Rx | 0 | 0 | Second | C1/N2; C2/N3; C3/N5 |
| 802.11 Rx in | 0 | 0 | First | C1/N2; C2/N3; C3/N5 |
| Bluetooth ™ Tx/Rx | 1 | 0 | First | C1/N1; C2/N3; C3/N6 |
| 802.11 Rx in | 1 | 0 | Second | C1/N1; C2/N3; C3/N6 |
| Bluetooth ™ Tx/Rx | X | 1 | Second | C1/N2; C2/N4; C3/N5 |
| 802.11 Tx out | X | 1 | First | C1/N2; C2/N4; C3/N5 |

The first exemplary antenna switch control scheme includes three antenna/device coupling scenarios. In a first antenna/device coupling scenario, the Bluetooth™ Tx/Rx device 122 is coupled to the second antenna 191 while the 802.11 Rx in device 262 is coupled to the first antenna 190. As shown in TABLE 1, the first coupling scenario is established by resetting the Ant_sel and 802.11_Tx control signals to a logical 0. In the first scenario, the first control signal 380 causes the first switch 310 to couple the first contact element C1 316 to the second node N2 314. The second control signal 382 causes the second switch 320 to couple the second contact element C2 326 to the third node N3 322. The third control signal 384 causes the third switch 330 to couple the third contact element C3 336 to the fifth node N5 332.

In a second antenna/device coupling scenario, the Bluetooth™ Tx/Rx device 122 is coupled to the first antenna 190 while the 802.11 Rx in device 262 is coupled to the second antenna 191. As shown in TABLE 1, the second antenna/device coupling scenario is established by setting the Ant_sel control signal to a logical 1 and resetting the 802.11_Tx control signal to a logical 0. In the second antenna/device coupling scenario, the first control signal 380 causes the first switch 310 to couple the first contact element C1 316 to the first node N1 312. The second control signal 382 causes the second switch 320 to couple the second contact element C2 326 to the third node N3 322. The third control signal 384 causes the third switch 330 to couple the third contact element C3 336 to the sixth node N6 334.

In a third antenna/device coupling scenario, the Bluetooth™ Tx/Rx device 122 is coupled to the second antenna 191 while the 802.11 Tx out device 264 is coupled to the first antenna 190. As shown in TABLE 1, the third coupling scenario is established by setting the 802.11_Tx control signal to a logical 1. The third coupling scenario is established regardless of the value of the Ant_sel control signal (i.e., the Ant_sel control signal can be set to either a logical 1 or 0 value). In this coupling scenario, the first control signal 380 causes the first switch 310 to couple the first contact element C1 316 to the second node N2 314. The second control signal 382 causes the second switch 320 to couple the second contact element C2 326 to the fourth node N4 324. The third control signal 384 causes the third switch 330 to couple the third contact element C3 336 to the fifth node N5 332.

The first exemplary control scheme is particularly useful when adequate electrical isolation exists between the first antenna and the second antenna so that the Bluetooth™ Tx/Rx device 122 is protected from the adverse effects of 802.11 transmissions. Thus, the Bluetooth™ Tx/Rx device 122 can attempt to continuously receive data. A second exemplary antenna switching apparatus is now described with reference to FIG. 5.

Figure 5:
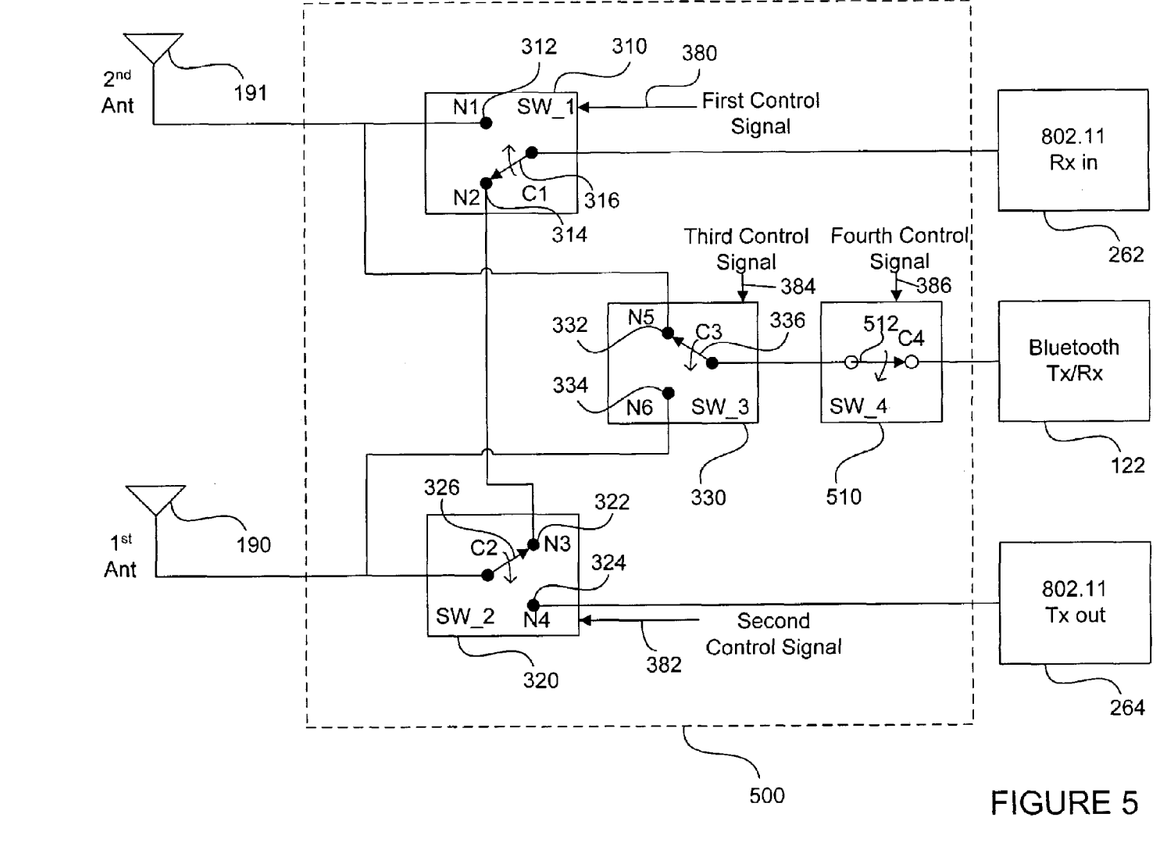
FIG. 5 is a simplified block diagram showing a second exemplary antenna switching apparatus adapted for use with the present invention.

The second exemplary antenna switching apparatus of FIG. 5 is substantially similar to the first exemplary antenna switching apparatus described above with reference to FIG. 3, and thus, identical elements are not described further hereinbelow. However, the second exemplary antenna switching apparatus includes an additional fourth switch that provides increased electrical isolation for the Bluetooth™ Tx/Rx device 122. When the 802.11 device is transmitting data, the fourth switch further decouples the Bluetooth™ Tx/Rx device 122 from the antennas, and thus, increases the electrical isolation of the Bluetooth™ Tx/Rx device during 802.11 transmissions.

FIG. 5 is a simplified block diagram showing a second exemplary antenna switching apparatus adapted for use with the present invention. The second exemplary antenna switching apparatus 500 is another embodiment of the switching apparatus 180 described above with reference to FIGS. 1 and 2.

As shown in FIG. 5, the second exemplary switching apparatus 500 includes a first switch (sw_1) 310, a second switch (sw_2) 320, a third switch (sw_3) 330 and a fourth switch (sw_4) 510. The fourth switch 510 is operatively coupled as shown to the third switch 330 and the Bluetooth™ Tx/Rx device 122. The fourth switch 510 includes a fourth contact element C4 512. The fourth contact element C4 512 can be selectively "switched" to couple (i.e., create a closed circuit) or decouple (i.e., create an open circuit) the third switch 330 from the Bluetooth™ Tx/Rx device 122. The fourth switch 510 receives a fourth control signal 386 that determines whether the fourth contact element C4 512 is opened or closed. In one embodiment of the second exemplary control scheme, the fourth control signal 386 corresponds to the 802.11_Tx control signal described above with reference to Table I. A second exemplary control scheme adapted for use with the second exemplary antenna switching apparatus 500 is now described.

The second exemplary control scheme is substantially similar to the first exemplary control scheme described above with reference to FIGS. 3, 4a and 4b. Similar to the first exemplary antenna switch control scheme described above, the second exemplary antenna switch control scheme includes three antenna/device coupling scenarios. As described in more detail below, the second exemplary control scheme also controls the operation of the fourth switch 510 (specifically, the operation of the fourth contact element C4 512).

The following table (TABLE 2) provides definitions used by the second exemplary antenna switch control scheme:

TABLE 2

|  | Ant_sel | 802.11_Tx | Antenna | Contact/Node |
|---|---|---|---|---|
| Bluetooth ™ Tx/Rx | 0 | 0 | Second | C1/N2; C2/N3; C3/N5; C4/C |
| 802.11 Rx in | 0 | 0 | First | C1/N2; C2/N3; C3/N5; C4/C |
| Bluetooth ™ Tx/Rx | 1 | 0 | First | C1/N1; C2/N3; C3/N6; C4/C |
| 802.11 Rx in | 1 | 0 | Second | C1/N1; C2/N3; C3/N6; C4/C |
| Bluetooth ™ Tx/Rx | X | 1 | Second* | C1/N2; C2/N4; C3/N5; C4/D |
| 802.11 Tx out | X | 1 | First | C1/N2; C2/N4; C3/N5; C4/D |

*Fourth switch provides isolation to the Bluetooth ™ device during active 802.11 transmissions.

In the first antenna/device coupling scenario, the Bluetooth™ Tx/Rx device 122 is coupled to the second antenna 191 while the 802.11 Rx in device 262 is coupled to the first antenna 190. As shown in TABLE 2, the first scenario is established by resetting the Ant_sel and the 802.11_Tx control signals to logical zeros. In the first coupling scenario, the fourth control signal 386 causes the fourth switch 510 to close (C4 is closed), and thus, the Bluetooth™ Tx/Rx device 122 is coupled to the third switch 330.

In the second-antenna/device coupling scenario, the Bluetooth™ Tx/Rx device 122 is coupled to the first antenna 190 while the 802.11 Rx in device 262 is coupled to the second antenna 191. As shown in TABLE 2, the second antenna/device coupling scenario is established by setting the Ant_sel signal to a logical 1, and resetting the 802.11_Tx control signal to a logical 0. In the second coupling scenario, the fourth control signal 386 causes the fourth switch 510 to close (i.e., C4 is closed), and thus, the Bluetooth™ Tx/Rx device 122 is coupled to the third switch 330.

In the third antenna/device coupling scenario, the Bluetooth™ Tx/Rx device 122 is switchably coupled to the second antenna 191 while the 802.11 Tx out device 264 is coupled to the first antenna 190. As shown in TABLE 2, the third coupling scenario is established by setting the 802.11 Tx control signal to a logical 1. The third coupling scenario is established regardless of the value of the Ant_sel control signal (i.e., the Ant_sel control signal can set to either a logical 1 or 0 value). The fourth switch 510 provides increased electrical isolation of the Bluetooth™ Tx/Rx device 122 when the 802.11 Tx out device 264 is actively transmitting. More specifically, and referring again to FIG. 5, during 802.11 transmissions, the fourth switch 510 opens the contact C4 512 and thereby decouples the Bluetooth™ Tx/Rx device 122 during active 802.11 transmissions.

The second exemplary antenna switching apparatus 500 of FIG. 5 is particularly useful when the electrical isolation afforded between the first and second antennas 190, 191 is not sufficient to adequately protect the Bluetooth™ Tx/Rx device from the adverse effects of 802.11 transmissions. The additional isolation provided by the decoupling of the fourth switch provides the additional isolation necessary to protect the Bluetooth™ Tx/Rx device from the 802.11 transmissions. A third exemplary antenna/device switching apparatus is now described with reference to FIG. 6.

The third exemplary antenna/device switching apparatus is substantially similar to the first exemplary antenna/device switching apparatus described above with reference to FIG. 3, and thus, identical elements are not further described hereinbelow. The third exemplary antenna/device switching apparatus provides electrical isolation of the Bluetooth™

Tx/Rx device 122 when the 802.11 device is transmitting. This isolation is provided to the Bluetooth™ Tx/Rx device by selectively coupling and decoupling the device from both the first and second antennas.

Figure 6:
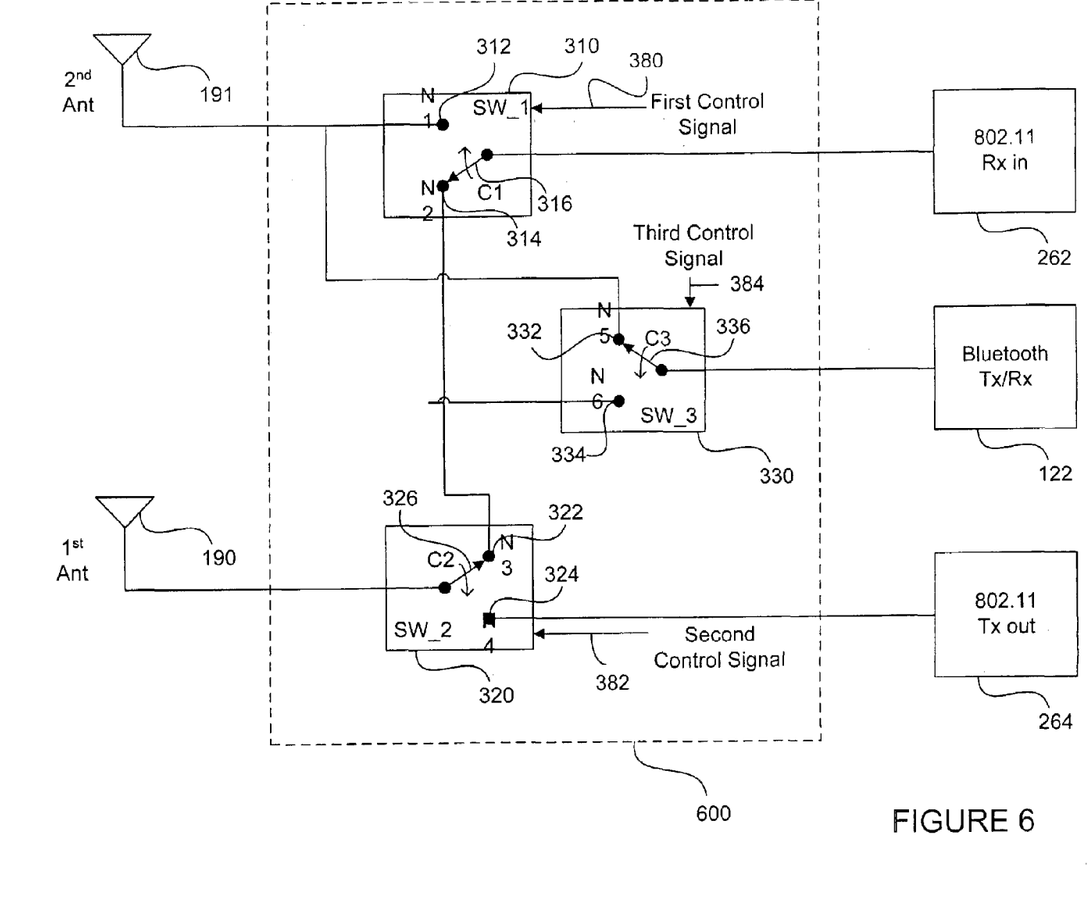
FIG. 6 is a simplified block diagram showing a third exemplary antenna switching apparatus adapted for use with the present invention.

FIG. 6 is a simplified block diagram showing a third exemplary antenna/device switching apparatus adapted for use with the present invention. The third exemplary switching apparatus 600 is substantially similar to the first exemplary switching apparatus 300 of FIG. 3. However, the sixth node N6 334 of the third switch 330 is operatively coupled to the second node N2 314 and to the third node N3 322 (instead of being coupled to the second contact element C2 326 as shown in FIG. 3). A third exemplary control scheme, used to control the third exemplary antenna switching apparatus 600 of FIG. 6, is now described.

In one embodiment of the third exemplary control scheme, a first switch control signal corresponds to an "Ant_sel" control signal. A second switch control signal corresponds to an "802.11_Tx" control signal. A third control signal corresponds to an output of the well-known logical "OR" operation of the "Ant_sel" control signal and the inverse of the "802.11_Tx" control signal. Similar to the first and second exemplary antenna switch control schemes described above, the third exemplary antenna switch control scheme includes three possible antenna/device coupling scenarios.

The following table (TABLE 3) provides definitions used by the third exemplary antenna switch control scheme:

TABLE 3

|  | Ant_sel | 802.11_Tx | Antenna | Contact/Node |
|---|---|---|---|---|
| Bluetooth ™ Tx/Rx | 0 | 0 | Second | C1/N2; C2/N3; C3/N5 |
| 802.11 Rx in | 0 | 0 | First | C1/N2; C2/N3; C3/N5 |
| Bluetooth ™ Tx/Rx | 1 | 0 | First | C1/N1; C2/N3; C3/N6 |
| 802.11 Rx in | 1 | 0 | Second | C1/N1; C2/N3; C3/N6 |
| Bluetooth ™ Tx/Rx | X | 1 | Neither | C1/N2; C2/N4; C3/N6 |
| 802.11 Tx out | X | 1 | First | C1/N2; C2/N4; C3/N6 |

In a first antenna/device coupling scenario, the Bluetooth™ Tx/Rx device 122 is coupled to the second antenna 191 while the 802.11 Rx in device 262 is coupled to the first antenna 190. As shown in TABLE 3, the first antenna/device coupling scenario is established by resetting the Ant_sel and 802.11_Tx control signals to logical 0 values. In the first coupling scenario, a first control signal 380 causes the first switch 310 to couple the first contact element C1 316 to the second node N2 314. A second control signal 382 causes the second switch 320 to couple the second contact element C2 326 to the third node N3 322. A third control signal 384 causes the third switch 330 to couple the third contact element C3 336 to the fifth node N5 332.

In a second antenna/device coupling scenario, the Bluetooth™ Tx/Rx device 122 is coupled to the first antenna 190 while the 802.11 Rx in device 262 is coupled to the second antenna 191. As shown in TABLE 3, the second antenna/device coupling scenario is established by setting the Ant_sel control signal to a logical 1 value and resetting the 802.11_Tx control signal to a logical 0 value. In the second coupling scenario, the first control signal 380 causes the first switch 310 to couple the first contact element C1 316 to the first node N1 312. The second control signal 382 causes the second switch 320 to couple the second contact element C2 326 to the third node N3 322. The third control signal 384 causes the third switch 330 to couple the third contact element C3 336 to the sixth node N6 334.

In a third antenna/device coupling scenario, the Bluetooth™ Tx/Rx device 122 is decoupled from both antennas while the 802.11 Tx out device 264 is coupled to the first antenna 190. As shown in TABLE 3, the third switch coupling scenario is established by setting the 802.11_Tx control signal to a logical 1. The third switch coupling scenario occurs regardless of the state of the Ant_sel control signal (i.e., the Ant_sel signal can be set to either a logical 1 or 0). In accordance with this coupling scenario, the first control signal 380 causes the first switch 310 to couple the first contact element C1 316 to the second node N2 314. The second control signal 382 causes the second switch 320 to couple the second contact element C2 326 to the fourth node N4 324. The third control signal 384 causes the third switch 330 to couple the third contact element C3 336 to the sixth node N6 334.

Thus, in accordance with this embodiment of the present invention, the Bluetooth™ Tx/Rx device 122 is sufficiently isolated from both of the antennas 190, 191 during active 802.11 transmissions. Specifically, the 802.11 transmit out device 264 is coupled (through the second switch 320) to the first antenna 190. The 802.11 Receive in device 262 is decoupled from both the first and second antennas (as a result of the switch settings of the first switch 310 and the second switch 320). The Bluetooth™ Tx/Rx device 122 is also decoupled from both the first and second antennas (as a result of the switch settings of the second switch 320 and the third switch 330).

Two exemplary inventive dual-mode radio (DMR) antenna switching methods are now described with reference to FIGS. 7 and 8.

Dual-Mode Radio Antenna Switching Methods of the Present Invention

The present inventive dual-mode radio antenna switching methods provide Bluetooth™ and 802.11 functionality in a dual-mode radio using a switching apparatus capable of selectively coupling multiple antennas to multiple radios. The exemplary DMRs described above with reference to FIGS. 3, 5 and 6 may be used in conjunction with the present inventive DMR antenna switching methods described below. However, this is not meant to limit the present invention, as those skilled in the communication arts shall recognize that the inventive DMR antenna switching methods can be used with different DMRs without departing from the scope or spirit of the present invention. For example, in one embodiment, a DMR that is configured with a single Bluetooth™ antenna and two 802.11 antennas can be used to practice the present inventive DMR antenna switching methods described below.

The DMR antenna switching methods described below provide a means for selectively coupling and decoupling multiple antennas to Bluetooth™ and 802.11 transmit and receive devices. The present invention reduces saturation of Bluetooth™ devices by providing electrical isolation of the Bluetooth™ receive devices and antennas during 802.11 transmission times.

Figure 7:
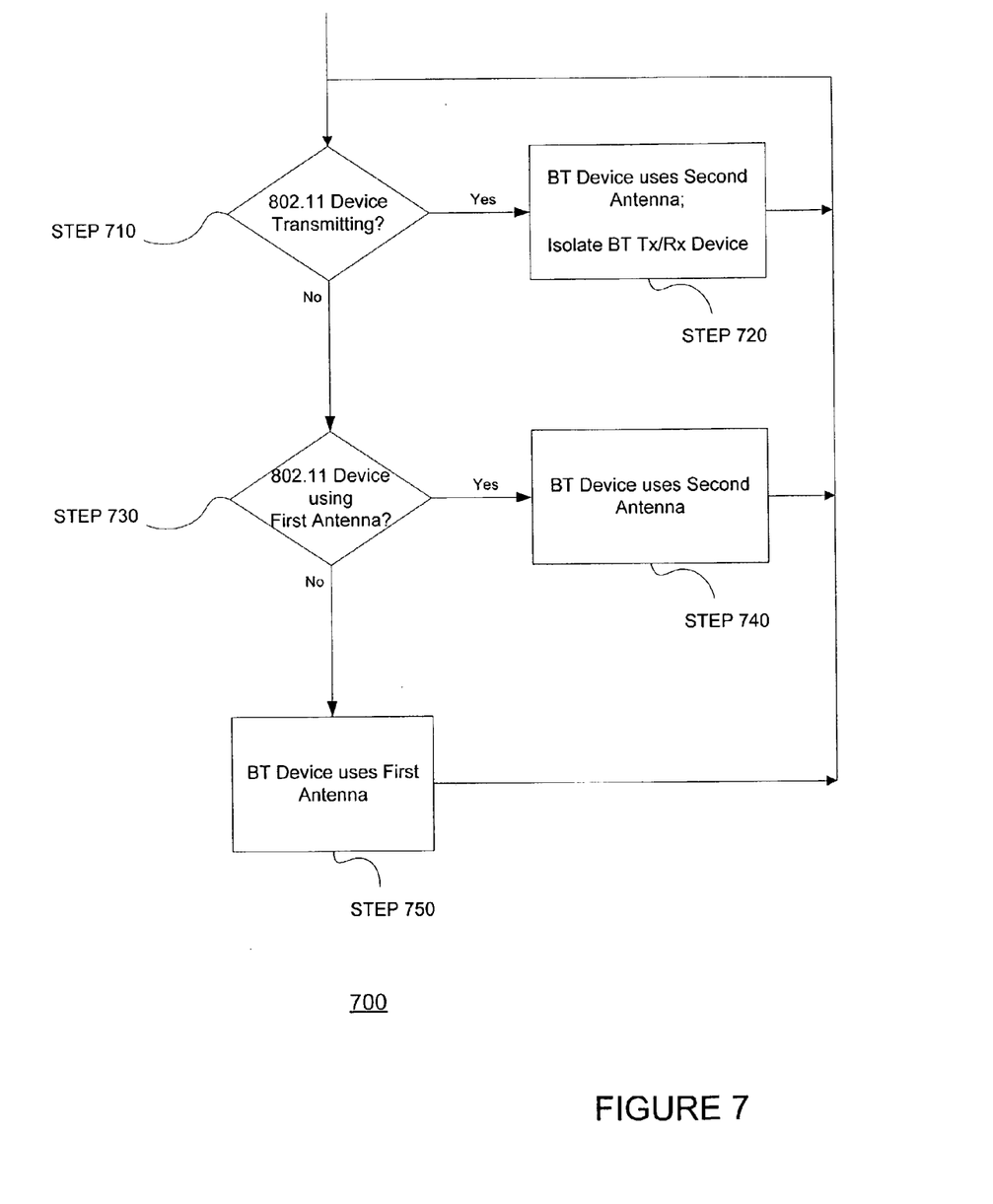
FIG. 7 is a flowchart of a first antenna switching method in accordance with the present invention.

FIG. 7 is a flowchart of a first switching method in accordance with the present invention. As shown in FIG. 7, the first switching method 700 begins at a decision STEP 710 whereat the method 700 determines whether an 802.11 Tx out device is transmitting data. If the method determines that the 802.11 Tx out device is transmitting, the method proceeds to a STEP 720, else, the method proceeds to a decision STEP 730. At the STEP 720, the method selects a second antenna for use with the Bluetooth™ Tx/Rx device and electrically isolates the Bluetooth™ Tx/Rx device from the 802.11 device. After the STEP 720, the method returns to the decision STEP 710 and continues to check the status of the 802.11 transmissions.

At the decision STEP 730, the antenna switching method determines whether the 802.11 device is using the first antenna for transmission. If the method determines that the 802.11 device is using the first antenna, the method proceeds to a STEP 740 whereat the method selects the second antenna for use with the Bluetooth™ Tx/Rx device. After the STEP 740, the method returns to the decision STEP 710. If the method determines at STEP 730 that the 802.11 device is not using the first antenna (i.e., the 802.11 device is using the second antenna), the method proceeds to a STEP 750 whereat the method selects the first antenna for use with the Bluetooth™ Tx/Rx device. After the STEP 750, the method returns to the decision STEP 710. A second inventive DMR antenna switching method is now described with reference to FIG. 8. The second antenna switching method 800 of FIG. 8 is similar to the first antenna switching method of FIG. 7, and thus, identical steps are not described in detail herein.

Figure 8:
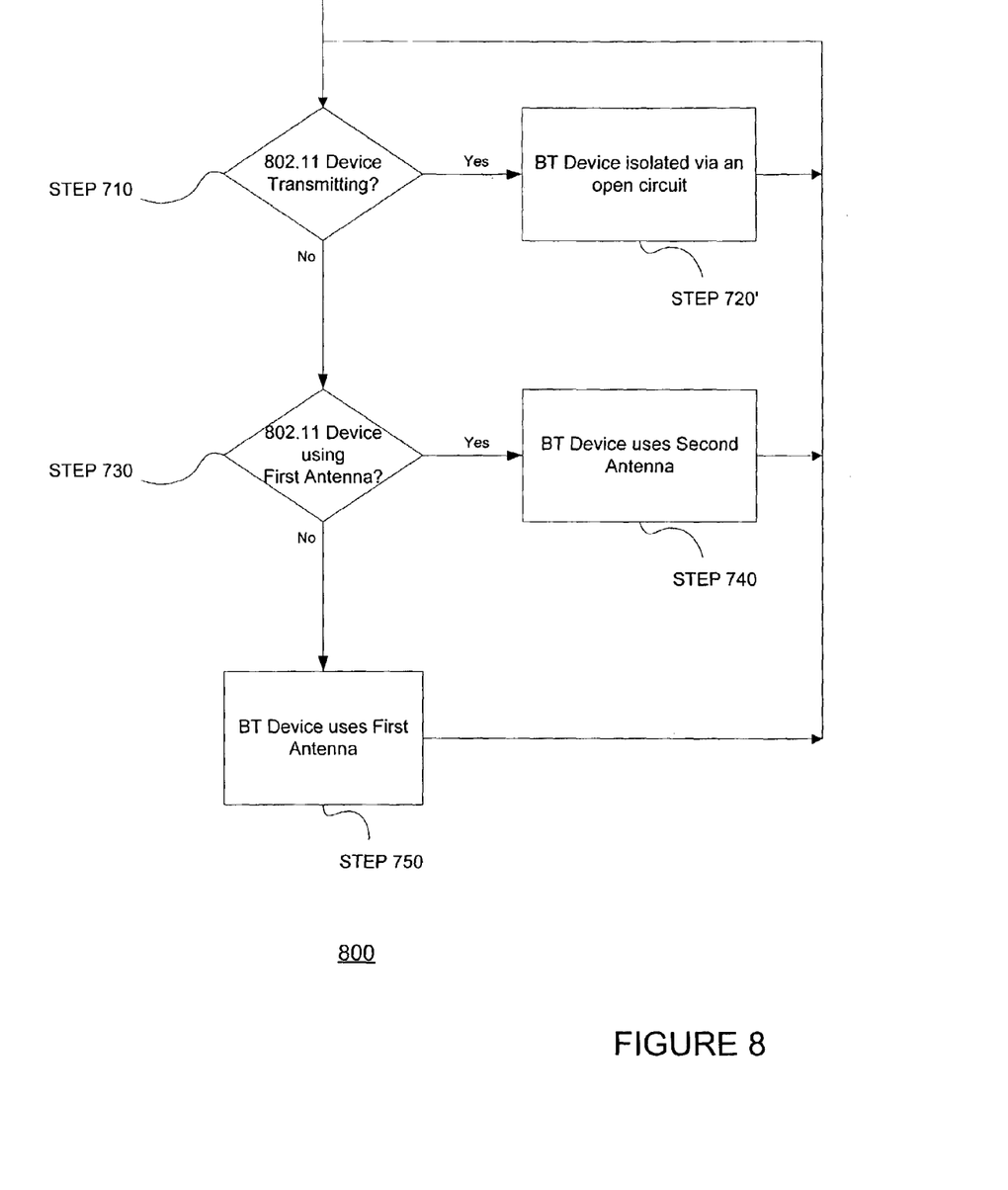
FIG. 8 is a flowchart of a second antenna switching method in accordance with the present invention.

As shown in FIG. 8, the second DMR antenna switching method 800 begins at a decision STEP 710 whereat the method determines whether an 802.11 Tx out device is currently transmitting data. If the method determines that the 802.11 Tx out device is transmitting, the method proceeds to a STEP 720', else, the method proceeds to a decision STEP 730 as described above.

At the STEP 720', the method creates an open circuit between the Bluetooth™ Tx/Rx device and the antennas. The open circuit effectively provides sufficient isolation between the Bluetooth™ device and the 802.11 device during 802.11 transmissions. After the STEP 720', the method returns to the decision STEP 710. The remaining steps of the second exemplary DMR antenna switching method 800 of FIG. 8 are similar to those of the first exemplary DMR antenna switching method 700 and are therefore not described in more detail.

SUMMARY

In summary, the present invention is a method and apparatus for a dual-mode radio (DMR) in a wireless communication system. The present invention facilitates the coexistence of Bluetooth™ and 802.11 devices operating in close proximity to each other within a DMR. The present inventive method and apparatus allows Bluetooth™ and 802.11 devices to operate together with reduced reception errors and decreased saturation of the Bluetooth™ devices.

The present inventive antenna/device switching method provides a means for selectively coupling and decoupling multiple antennas to Bluetooth™ and 802.11 transmit and receive devices. The present invention reduces potential saturation of the Bluetooth™ devices caused by the 802.11 transmit devices by providing electrical separation between the Bluetooth™ receive devices and the 802.11 transmit devices during 802.11 transmission times.

The present inventive DMR antenna switching apparatus includes a plurality of switches that are capable of selectively coupling and decoupling a first and second antenna to an 802.11 and a Bluetooth™ device. The inventive apparatus provides electrical isolation and separation between the Bluetooth™ receive devices and the antennas used by the 802.11 transmitting devices.

A number of embodiments of the present invention have been described. Nevertheless, it will be understood that various modifications may be made without departing from the spirit and scope of the invention. For example, the present inventive method and apparatus can be utilized with virtually any wireless communication application that uses a dual-mode radio. Accordingly, it is to be understood that the invention is not to be limited by the specific illustrated embodiments, but only by the scope of the appended claims.

What is claimed is:

1. A method of operating a dual-mode radio ("DMR") in a wireless communication system, wherein the DMR includes a Bluetooth™ ("BT") radio, an 802.11 radio, a first antenna, a second antenna and an antenna/device switch, and wherein the antenna/device switch includes circuitry that selectively couples and decouples the antennas to the BT and 802.11 radios, the method comprising the acts of:

(a) determining whether the 802.11 radio is transmitting;
(b) if the 802.11 radio is transmitting data using a selected antenna, electrically isolating the Bluetooth™ radio from the selected antenna and returning to the act (a);
(c) if the 802.11 radio is not transmitting data, determining whether the 802.11 radio is using the first antenna;
(d) if the 802.11 radio is determined to be using the first antenna in act (c), selecting the second antenna for use by the Bluetooth™ radio and returning to the act (a); and
(e) if the 802.11 radio is determined to not be using the first antenna in act (c), selecting the first antenna for use by the Bluetooth™ radio and returning to the act (a).

2. The method of claim 1, wherein the act (b) of electrically isolating the Bluetooth™ radio comprises creating an open circuit between the Bluetooth™ radio and the antennas.

3. The method of claim 2, wherein the isolating act (b) comprises selecting the second antenna for use by the Bluetooth™ radio.

4. A dual-mode radio ("DMR") antenna switch for use in a dual-mode wireless communication radio, wherein the DMR includes a Bluetooth™ ("BT") Tx/Rx device, an 802.11 Tx out device, an 802.11 Rx in device, and at least a first and a second antenna, the DMR antenna switch comprising:

(a) a first switch, operatively coupled to the second antenna and the 802.11 Rx in device, wherein the first switch receives a first control signal, and wherein the first control signal determines a switch position of the first switch;
(b) a second switch, operatively coupled to the first switch, the first antenna and the 802.11 Tx out device, wherein the second switch receives a second control signal, and wherein the second control signal determines a switch position of the second switch; and
(c) a third switch, operatively coupled to the first antenna, the second antenna, the first switch, the second switch and the Bluetooth™ Tx/Rx device, wherein the third switch receives a third control signal, and wherein the third control signal determines a switch position of the third switch, wherein the first switch couples the second antenna to the 802.11 Rx in device in response to a first value of the first control signal, and wherein the first switch couples the 802.11 Rx in device to the second switch in response to a second value of the first control signal, wherein the second switch couples the first antenna to the 802.11 Tx out device in response to a first value of the second control signal, and wherein the second switch couples the first antenna to the first switch in response to a second value of the second control signal, and wherein the third switch couples the Bluetooth™ Tx/Rx device the first antenna in response to a first value of the third control signal, and wherein the third switch couples the Bluetooth™ Tx/Rx device to the second antenna in response to a second value of the third control signal.

5. The dual-mode radio antenna switch of claim 4, wherein the third switch includes:
  (1) a fifth node, operatively coupled to the second antenna and the first switch;
  (2) a sixth node, operatively coupled to the first antenna and the second switch; and
  (3) a third contact element, operatively coupled to the Bluetooth™ Tx/Rx device, wherein the third contact element selectively couples the Bluetooth™ Tx/Rx device to either the fifth or sixth nodes in response to the third control signal.

6. The dual-mode radio antenna switch of claim 5, wherein the second switch includes:
  (1) a third node, operatively coupled to the first switch;
  (2) a fourth node, operatively coupled to the 802.11 Tx out device; and
  (3) a second contact element, operatively coupled to the first antenna and the third switch, wherein the second contact element selectively couples the first antenna to either the third or fourth nodes in response to the second control signal.

7. The dual-mode radio antenna switch of claim 6, wherein the first switch includes:
  (1) a first node, operatively coupled to the second antenna and the third switch;
  (2) a second node, operatively coupled to the second switch; and
  (3) a first contact element, operatively coupled to the 802.11 Rx in device, wherein the first contact element selectively couples the 802.11 Rx in device to either the first or second nodes in response to the first control signal.

8. The dual-mode radio antenna switch of claim 7, wherein the third node of the second switch is coupled to the second node of the first switch, and wherein the fourth node of the second switch is coupled to the 802.11 Tx out device, and wherein the second contact element selectively couples the first antenna to either the third node or the fourth node in response to the second control signal.

9. The dual-mode radio antenna switch of claim 8, wherein the fifth node is operatively coupled to the second antenna and the first node, and wherein the sixth node is operatively coupled to the first antenna and the second contact element, and wherein the third contact element is operatively coupled to the Bluetooth™ Tx/Rx device, wherein the third contact element selectively couples the Bluetooth™ Tx/Rx device to either the fifth or sixth nodes in response to the third control signal.

10. The dual-mode radio antenna switch of claim 9, wherein a first control scheme uses the first control signal, the second control signal and the third control signal to select one of at least three scenarios for antenna switching.

11. The dual-mode radio antenna switch of claim 10, wherein the first control signal corresponds to an Ant_sel control signal, the second control signal corresponds to an 802.11_Tx control signal, and wherein the third control signal corresponds to an output of the Ant_sel control signal logically ANDed with an inverse of the 802.11_Tx control signal.

12. The dual-mode radio antenna switch of claim 11, wherein when the Ant_sel and 802.11_Tx control signals are reset to a logical 0 value, the first contact element is operatively coupled to the second node, and the second contact element is operatively coupled to the third node, and the third contact element is operatively coupled to the fifth node.

13. The dual-mode radio antenna switch of claim 11, wherein when the Ant_sel control signal is set to a logical 1 value and the 802.11_Tx control signal is reset to a logical 0 value, the first contact element is operatively coupled to the first node, and the second contact element is operatively coupled to the fourth node, and the third contact element is operatively coupled to the sixth node.

14. The dual-mode radio antenna switch of claim 11, wherein when the 802.11_Tx signal is set to a logical 1 value, the first contact element is coupled to the second node, the second contact element is coupled to the fourth node, and the third contact element is coupled to the fifth node.

15. The dual-mode radio antenna switch of claim 9, further comprising:
  (a) a fourth switch, operatively coupled to the third contact element and the Bluetooth™ Tx/Rx device, including a fourth contact element, wherein the fourth switch receives a fourth control signal, and wherein the fourth control signal determines the switch position of the fourth switch, and wherein the fourth contact element couples the Bluetooth™ Tx/Rx device to the third switch in response to the fourth control signal.

16. The dual-mode radio antenna switch of claim 15, wherein a second control scheme uses the first control signal, the second control signal, the third control signal and the fourth control signal to select one of at least three scenarios antenna switching scenarios.

17. The dual-mode radio antenna switch of claim 16, wherein the first control signal corresponds to an Ant_sel control signal, and wherein the second control signal corresponds to an 802.11_Tx control signal, and wherein the third control signal corresponds to an output of the Ant_sel control signal logically ANDed with an inverse of the 802.11_Tx control signal, and wherein the fourth control signal corresponds to the 802.11_Tx control signal.

18. The dual-mode radio antenna switch of claim 17, wherein when the Ant_sel and the 802.11 Tx control signals are reset to logical 0 values, and wherein the first contact element is coupled to the second node, the second contact element is coupled to the third node, the third contact element is coupled to the fifth node, and the fourth contact element selectively couples the third switch to the Bluetooth™ Tx/Rx device.

19. The dual-mode radio antenna switch of claim 17, wherein when the Ant_sel control signal is set to a logical 1 value and the 802.11_Tx control signal is reset to a logical 0 value, the first contact element is coupled to the first node, the second contact element is coupled to the fourth node, the third contact element is coupled to the sixth node, and the fourth contact element selectively couples the third switch to the Bluetooth™ Tx/Rx device.

20. The dual-mode radio antenna switch of claim 17, wherein when the 802.11_Tx control signal is set to a logical 1 value, the first contact element is coupled to the second node, the second contact element is coupled to the fourth node, the third contact element is coupled to the fifth node, and the fourth contact element decouples the third switch from the Bluetooth™ Tx/Rx device.

21. A dual-mode radio ("DMR") for use in a wireless communication system, comprising:
(a) an 802.11 transmission device;
(b) an 802.11 reception device;
(c) a Bluetooth™ transmission/reception device;
(d) a first antenna;
(e) a second antenna;
(f) a first switch, operatively coupled to the second antenna and the 802.11 reception device;
(g) a second switch, operatively coupled to the first switch, the first antenna and the 802.11 transmission device; and
(h) a third switch, operatively coupled to the first antenna, the second antenna and the Bluetooth™ transmission/reception device;
wherein the first switch selectively couples and decouples the 802.11 reception device from the second antenna in response to a first control signal, and wherein the first switch couples and decouples the 802.11 reception device from the second switch in response to the first control signal, wherein the second switch selectively couples and decouples the first antenna from the 802.11 transmission device in response to a second control signal, and wherein the second switch selectively couples and decouples the first antenna from the first switch in response to the second control signal, and wherein the third switch selectively couples and decouples the Bluetooth™ transmission/reception device from the first and second antennas in response to a third control signal.

22. An apparatus for operating a dual-mode radio ("DMR") in a wireless communication system, wherein the DMR includes a Bluetooth™ ("BT") radio, an 802.11 radio, a first antenna, a second antenna and an antenna/device switch, and wherein the antenna/device switch includes circuitry that selectively couples and decouples the antennas to the BT and 802.11 radios, the apparatus comprising:
(a) means for determining whether the 802.11 radio is transmitting using a selected antenna;
(b) means, operatively coupled to the determining means, for electrically isolating the Bluetooth™ radio from the selected antenna when the 802.11 radio is transmitting using the selected antenna;
(c) means, operatively coupled to the determining means, for determining whether the 802.11 radio is using the first antenna when the 802.11 radio is not transmitting;
(d) means, operatively coupled to the 802.11 first antenna determining means, for selecting the second antenna for use by the Bluetooth™ radio when the 802.11 radio is using the first antenna; and
(e) means, operatively coupled to the 802.11 first antenna determining means, for selecting the first antenna for use by the Bluetooth™ radio when the 802.11 radio is not using the first antenna.

23. The apparatus of claim 22, wherein the isolating the Bluetooth™ radio means comprises a means for creating an open circuit between the Bluetooth™ radio and the antennas.

24. The apparatus of claim 23, wherein the isolating the Bluetooth™ radio means further comprises a means for selecting the second antenna for by with the Bluetooth™ radio.

* * * * *